United States Patent [19]

Siol et al.

[11] Patent Number: 4,754,008

[45] Date of Patent: Jun. 28, 1988

[54] HEAT RESISTANT MOLDING COMPOUNDS

[75] Inventors: Werner Siol, Darmstadt; Ulrich Terbrack, Reinheim; Frank Wenzel, Darmstadt; Winfried Wunderlich, Rossdorf, all of Fed. Rep. of Germany

[73] Assignee: Röhm GmbH, Darmstadt, Fed. Rep. of Germany

[21] Appl. No.: 34,685

[22] Filed: Apr. 6, 1987

[30] Foreign Application Priority Data

Apr. 16, 1986 [DE] Fed. Rep. of Germany ....... 3612773

[51] Int. Cl.$^4$ .......................... C08F 2/00; C08F 20/44
[52] U.S. Cl. .................................. 526/224; 526/329.2
[58] Field of Search ...................... 526/329.2, 347, 224

[56] References Cited

U.S. PATENT DOCUMENTS

| 2,984,651 | 5/1961 | Slocombe et al. | 526/329.2 |
|---|---|---|---|
| 3,072,622 | 1/1963 | Ham | 526/329.2 |
| 3,135,723 | 6/1964 | Vandegaer | 526/329.2 |
| 3,969,297 | 7/1976 | Tear et al. | 526/224 |
| 4,001,484 | 1/1977 | Song | 526/329.2 |
| 4,086,410 | 4/1978 | Song | 526/329.2 |

FOREIGN PATENT DOCUMENTS

| 1210189 | 2/1966 | Fed. Rep. of Germany . | |
| 1595024 | 4/1970 | Fed. Rep. of Germany . | |
| 56-139513 | 10/1981 | Japan | 526/329.2 |
| 57-109812 | 7/1982 | Japan | 526/224 |
| 58-61108 | 4/1983 | Japan | 526/329.2 |
| 961411 | 6/1964 | United Kingdom | 526/224 |
| 1116509 | 6/1968 | United Kingdom . | |

OTHER PUBLICATIONS

C.A. 65 2373a (1966).
Methoden der Organischen Chemie XIV II, pp. 145 and 1048–1053.
Ullmanns Enzyklopaedie der Technishcen Chemie, 4th Ed., vol. 13, p. 601; vol. 15, p. 191; vol. 19, pp. 132–134.

*Primary Examiner*—Joseph L. Schofer
*Assistant Examiner*—N. Sarofim
*Attorney, Agent, or Firm*—Curtis, Morris & Safford

[57] ABSTRACT

A method for making thermostable methyl methacrylate/alpha-methylstyrene copolymers having a high heat distortion temperature and adaptable to use as molding compounds by emulsion polymerization of these monomers together with lower alkyl acrylates and/or styrene, the water phase being less than 70 weight percent of the total monomer/water components and the amount of emulsifier being less than 0.5 weight percent of the water component, the copolymer being isolated by freeze coagulation or extruder pinch-off.

9 Claims, No Drawings

HEAT RESISTANT MOLDING COMPOUNDS

The present invention relates to methods for making copolymers of methyl methacrylate and alpha-methylstyrene adaptable to use as molding compositions having a high glass transition temperature.

THE PRIOR ART

Methyl methacrylate/alpha-methylstyrene copolymers have found use in the production of molded articles which are resistant to boiling or are heat resistant to about 110° C. However, because of their unsatisfactory thermal stability, these copolymers are difficult to process since they undergo appreciable depolymerization at the required processing temperatures. Besides, these copolymers are difficult to produce by bulk or bead polymerization because the polymerization proceeds slowly.

The inclusion in the copolymer of other copolymerizable vinyl compounds, such as styrene or acrylic esters or N-vinylsuccinic acid imide, as described in German Patent Publication No. 12 10 189, will result in an improvement in thermal stability.

Production can be improved in accordance with German Patent Publication No. 15 95 024, according to which a molding composition consisting of more than 55 parts by weight of methyl methacrylate, from 5 to 40 parts by weight of alpha-methylstyrene, and from 1 to 10 parts by weight of an alkyl acrylate is obtained in relatively short reaction times by emulsion polymerization at a temperature between 50° C. and 140° C. However, from the data given in that publication on polymer content and working up of the emulsion polymers, it is apparent that the process there disclosed is not economical. Removal of the water content of the emulsions, roughly 75 percent by weight, by heating requires the expenditure of considerable energy. Several washes with lower alcohols and water then follow for removing as completely as possible auxiliary agents which otherwise would result in hazing of the molding compositions.

THE OBJECT OF THE INVENTION

The object of the present invention is to provide a technically and economically improved process for the production of thermoplastically processable polymers comprising methyl methacrylate and alpha-methylstyrene and useful as molding compositions having high heat distortion temperature and high thermal stability.

In accordance with the invention, this object is accomplished by producing the thermally stable polymers by emulsion polymerization in an aqueous medium of a monomer blend composed of more than 30 parts by weight of methyl methacrylate, from 10 to 60 parts by weight of alpha-methylstyrene, and from 0 to 20, and preferably from 2 to 5, parts by weight of an alkyl acrylate having from 1 to 4 carbon atoms in the alcohol portion and/or of styrene, and optionally of a further monomer, in amounts of from 0 to 10, and preferably from 1 to 10, percent by weight of the other monomers, the amount of water being less than 70 percent of the total weight of monomers and water. The amount of emulsifier employed is less than 2 percent, and preferably less than 0.5 percent by weight of the water used. The polymer, ready for thermoplastic processing, is isolated in practically one step by spray drying or preferably by extruder pinch-off or freeze coagulation.

The emulsion polymerization is advantageously carried out in the presence of sulfurous chain-transfer agents. The process of the invention yields crystal clear colorless polymers which, by reason of their composition and especially because of their content of alpha-methylstyrene, have high heat distortion temperatures, measured as Vicat softening points in conformity with DIN 53460, from about 125° C. to about 150° C. Because of their high thermal stability, the polymers are readily processable thermo-plastically into complex shapes, for example by injection molding. The polymers produced by the process of the invention are distinguished in particular by a TD value greater than 270° C., preferably greater than 290° C. By TD value is meant the temperature (in °C.) at which a polymer specimen during a dynamic gravimetric test in vacuum with a rate of heat increase of 5° C./minute exhibits a weight loss of 2 percent. This combination of high heat distortion temperature and high thermal stability (=processing stability) surprisingly results from the combination of 1. the monomer composition cited;
2. emulsion polymerization at between 30° C. and 150° C.;
3. adjusting particle size to less than 1000 nanometers (nm);
4. the use of small amounts of initiator;
5. the selection of a specific initiator/chain transfer agent ratio;
6. the use of small amounts of emulsifier; and
7. working up with separation of the water phase.

The residual monomer content of the polymer is usually less than 2 percent and preferably less than 0.5 percent by weight of the polymer.

PRACTICE OF THE INVENTION

The production of the copolymers is carried out in keeping with emulsion polymerization techniques known in the prior art and described, for example, in *Methoden der organischen Chemie* ("Methods of Organic Chemistry"), vol. XIV/1 (1961); *Makromolekulare Stoffe* ("Macromolecular I Materials"), p. 145 and pp. 1048–1053, and in *Ullmanns Enzyklopädie der technischen Chemie* ("Encyclopedia of Technical Chemistry"), 4th Ed., Vol. 13, p. 601; Vol. 15, p. 191; and Vol. 19, pp. 132 ff.

In accordance with the invention, the monomeric compounds, namely methyl methacrylate, alpha-methylstyrene, and one or more lower acrylic esters or styrene, and still further optional monomers in minor amounts, are polymerized as a monomer blend in an aqueous medium at temperatures ranging from about 30° C. to 150° C., the weight ratio of the amount of water to the amount of monomers ranging from 70:30 to 30:70, and preferably from 60:40 to 40:60.

The polymerization initiators used may be water soluble peroxygen compounds such as alkali metal persulfate or hydrogen peroxide, for example, but also organic peroxides or redox systems such as sodium pyrosulfite/potassium persulfate. The amount of initiator may range from 0.0001 to 1 percent, preferably from 0.001 to 0.2 percent, and most preferably ranges from 0.002 to 0.1 percent, based on the weight of monomers to be polymerized.

The size of the particles in the dispersion is of particular importance. Very finely divided polymer dispersions are preferred. As a rule, the particle diameter should range from 40 to 1000 nanometers, preferably is from 40 to 500 nm, and most preferably is from 50 to 300 nm. The particle size can be determined by means of an electron microscope or an ultracentrifuge.

Despite this small particle size, the emulsifier content should be kept small, that is less than 2 percent, and preferably less than 0.5 percent, by weight of the water phase. With the addition of chain transfer agents, a solution viscosity, $\eta_{spec/c}$, of the polymer ranging from 20 to 200 ml/g, and more particularly from 30 to 150 ml/g, is established as determined in conformity with DIN 51562 in chloroform at 20° C.

Suitable chain transfer agents include compounds containing halogen atoms, for example $CCl_4$; however, mercaptans are preferred.

Sulfurous chain transfer agents which can be used to advantage in the polymerization, not only for control of the molecular weight and hence of the viscosity and the processing of the polymer, but also to increase its thermal stability, are primarily the alkyl mercaptans, for example n-butyl mercaptan or tert.-dodecyl mercaptan, or thioglycolic acid esters such as thioglycolic acid-2-ethylhexyl ester, and also thiophenol or polyfunctional mercaptans having from 2 to 6 SH groups. The initiator/chain transfer agent combination influencing the process of the polymerization should contain the two components in a molar ratio ranging from 1:1 to 1:10000, and preferably from 1:5 to 1:200.

The emulsifiers employed should be used in amounts of less than 2.0 percent, preferably less than 0.5 percent, and more particularly from 0.1 to 0.3 percent by weight of the water phase.

It has further been found that clear polymers having a high heat distortion temperature are obtained when the final phase of the polymerization, that is conversion of the monomer from 90 to 100 percent, and in particular from 95 to 100 percent, and preferably from 98 to 100 percent, is controlled by specific measures.

One such measure is the degassing of the dispersion. Another is the gradual addition of the monomers or mixtures of monomers, especially such as contain less alpha-methylstyrene than corresponds stoichometrically to that present in the total polymer.

Surprisingly, clear products are obtained also when the polymerization temperature is lowered toward the end of the reaction. This is in contrast with the usual practice, where the final phase of the polymerization is carried out at an increased temperature.

Emulsion polymerization of the monomer blend in the presence of minor amounts of solvents, or with the addition of solvents, for example n-butyl acetate in an amount of about 5 percent by weight of the polymer, during the final phase of the polymerization is also advantageous. A combination of reducing the polymerization temperature at the end and polymerization and operation in the present of minor amounts of solvent is particularly advantageous.

The emulsion polymerization is preferably carried out under an inert gas (nitrogen, argon, etc.) or in the absence of a gas phase. It can be run either as a batch process, for example a gradual addition process, or continuously. Preferred is a batch process in which all monomers, chain transfer agents, auxiliary agents, etc., are charged together in a stirred tank reactor. Quite generally, processes are particularly preferred in which over 45 percent, and preferably over 90 percent, by weight of the total polymers is added to the polymerization mixture before 20 percent and much preferably 10 percent by weight of the monomers are polymerized.

For a continuous process, a tubular reactor or cascaded stirred tank reactors are particularly suitable. If a gradual addition process is to be chosen, care should be taken to add as little inhibitor, for example atmospheric oxygen, as possible with the monomers. Such runs counter to the intent of the invention to increase the amount of initiator while carrying out the polymerization. Rather, care should be taken to carry out the polymerization with the smallest possible amount of initiator, and hence with the lowest possible initiator/chain transfer agent ratio.

Moreover, in accordance with the invention the isolation of the dispersed polymer, and hence the separation of water and with it the separation of substances interfering with the further processing of the polymer, are effected by modern methods for separating solids such as spray drying or, advantageously, freeze coagulation, or particularly extruder pinch-off. By these methods, the polymer can be recovered as a valuable intermediate product with considerably less expenditure of energy and with fewer unit operations than in the prior art. It is an important feature of the invention that when the process parameters described above are observed, the onerous working up and purifying of the product now necessary can, surprisingly, be dispensed with. Low molecular weight or polymeric stabilizing agents such as ultraviolet stabilizers, antioxidants, mold release agents, slip agents, etc., may be added to the molding compositions obtained by the process of the invention.

The molding compositions produced by the process of the invention can be thermoplastically processed between 180° C. and 300° C. by extrusion, injection molding, compression molding, etc., to form shaped articles, sheets, or foils.

These compositions are used especially where high heat distortion temperature, high processing stability, low residual monomer content, and high light transmittance are required at the same time. A preferred area of use therefore is in the manufacture of heavy duty lamp covers and automobile headlight covers as well as the entire household sector, including water-carrying sanitary ware. The intrinsically good mechanical strength can be improved by admixture with impact-strength modifiers. In a preferred embodiment, the impact-strength modifier may also be prepared as an emulsion polymer, and the modified molding composition having a high heat distortion temperature may then be produced by admixing the aqueous dispersions, followed by separation of the water.

A better understanding of the present invention and of its many advantages will be had by referring to the following specific examples, given by way of illustration.

EXAMPLE 1

2800 g of distilled water,
20 g of the sodium salt of a mixture of hexadecane- and tetradecane-sulfonic acids,
0.0025 g of ferrous sulfate,
1360 g of methyl methacrylate,
600 g of 2-methylstyrene,
40 g of methyl acrylate, and
6 g of 2-ethylhexyl thioglycolate are emulsified in a polymerization kettle. Then 10 g potassium persulfate in 200 g of water are added and the charge is heated to 64° C. under argon as a protective gas. Polymerization is initiated by the addition of 2 g of sodium bisulfite. The batch is stirred for about 1 hour at about 65° C. internal temperature. This is followed by gradual cooling. (Temperature reduction about 5° C. per hour).

At the same time, a mixture of 2 g of sodium bisulfite,
15 g of the above emulsifier, and
200 g of water is gradually added.

The dispersion obtained is frozen at −16° C., then thawed, washed with water, and dried.

Residual monomer content of the powder so obtained: 0.05 wt. %. The polymer has a solution viscosity, $\eta_{spec/c}$, of 63 ml/g. Thermal stability measured on the powder: TD=292° C. The powder is used to compression mold a plaque 3 mm thick, which has a Vicat softening point of 138° C.

EXAMPLE 2

45,000 g of distilled water,
300 g of the sodium salt of a mixture of hecadecane- and tetradecane-sulfonic acids,
100 g of potassium persulfate,
0.037 g of ferrous sulfate,
20,400 g of methyl methacrylate,
9000 g of alpha-methylstyrene,
600 g of methyl acrylate, and
120 g of 2-ethylhexyl thioglycolate are emulsified under a nitrogen atmosphere in a 100 liter stirred tank reactor.

Reaction is initiated by the addition of 30 g of sodium bisulfite dissolved in 100 g of water. After 2 hours, a solution of 25 g of sodium bisulfite and 200 g of the above emulsifier is added.

When the internal temperature has again dropped to 65° C., an emulsion of 1500 g of butyl acetate, 50 g of the above emulsifier, and 1500 g of water is added. After 15 minutes, a solution of 2 g of sodium bisulfite and 20 g of the above emulsifier in 50 g of water is added and the batch is slowly cooled to 40° C. A polymer dispersion with a residual monomer content of about 1.5% is obtained. Particle size (diameter) of dispersion: 68 nm. A portion of the dispersion is freeze coagulated as in Example 1.

The polymer has a solution viscosity $\eta_{spec/c}$ of 62 ml/g. The powder obtained by freeze coagulation is used to compression mold a plaque 3 mm thick. Vicat softening point: 133° C.

EXAMPLE 3

The isolation of the polymer solid from the dispersion of Example 2 took place by quenching of the aqueous phase in a pilot plant double-coil extruder (temperature range: 240° C.–170° C.) followed by degassing at 270° C.–250° C. in vacuum (less than 200 mbar). The extruder was rotating at 45 rpm with a throughput of about 10 kg of dispersion/hour.

A colorless glass clear granulate was obtained which was extruded to form a sheet about 2 mm thick. The Vicat softening temperature of the sheet was 133° C. Its residual monomer content was 0.34 percent by weight.

EXAMPLE 4

The granular material obtained in Example 3 is used to injection mold a test specimen 3 mm thick. Measurement of the heat distortion temperature results in a Vicat softening point of 132° C. Residual monomer content of the injection molded specimen: 0.5 wt. %.

EXAMPLE 5

The following ingredients were emulsified in a polymerization vessel:

2500 g of disilled water,
10 g of potassium peroxydisulfate,
2.5 g of the sodium salt of a mixture of hexadecane- and tetradecane-sulfonic acids,
0.0025 g of iron-III-sulfate,
5 g of styrene,
75 g of alpha-methyl styrene,
170 g of methyl methacrylate, and
0.77 g of 2-ethylhexyl thioglycolate.

The batch was warmed to 65° C. under argon as an inert gas. Polymerization was initiated by the addition of 0.5 g of sodium bisulfite and was stirred for 1 hour. After 1 hour, a mixture of 45 g of styrene, 625 g of alpha-methylstyrene, 1530 g of methyl methacrylate, and 6.93 g of 2-ethylhexyl thioglycolate was added, followed by the addition of 0.5 g of sodium bisulfite.

After 8 hours, the conversion was terminated by cooling.

A portion of the dispersion so obtained was then frozen at −16° C., subsequently thawed, washed with water, and dried. The polymer so obtained had a solution viscosity, $\eta_{sp/c}$ of 92 ml/g. The thermostability of the polymer, $T_D$, was measured at 288° C.

A pressed sheet 3 mm thick was prepared from the polymer and exhibited a Vicat softening point of 134° C.

A portion of the dispersion obtained was subsequently spray dried in a drying tower. A 3 mm thick pressed sheet was prepared from the powder and showed a Vicat softening point of 131° C.

What is claimed is:

1. A method for making a polymer, adaptable to use as a compound having a high heat distortion temperature, which method comprises emulsion copolymerizing, in the presence of a free radical polymerization initiator and of a mercaptan chain transfer agent, monomers consisting essentially of at least 30 parts by weight of methyl methacrylate, from 10 to 60 parts by weight of alpha-methylstyrene, and from 2 to 20 parts by weight of at least one member selected from the group consisting of styrene and alkyl acrylates having from 1 to 4 carbon atoms in the alcohol portion, in an aqueous medium, the amount of water being less than 70 percent of the total weight of the monomers and water, with an amount of less than 2 percent of emulsifier by weight of the water used, the particle size diameter of the resulting emulsion polymer ranging from 40 to 1000 nm, and then isolating the polymer from the dispersion by spray drying, coagulation, or extruder pinch-off.

2. A method as in claim 1 wherein the particle size diameter of said emulsion polymer ranges from 40 nm to 500 nm.

3. A method as in claim 1 wherein the particle size diameter of said emulsion polymer ranges from 50 nm to 300 nm.

4. A method as in claim 1 wherein the polymerization temperature is reduced during conversion of the last 10 percent by weight of monomers to polymer.

5. A method as in claim 1 wherein polymerization is initiated in a portion of the monomers to be polymerized, the remaining monomers are added to this portion during the course of polymerization, and wherein remaining monomers, containing alpha-methylstyrene in an amount at least 30 percent less by weight than the overall content of alpha-methylsytrene in all the monomers to be polymerized, are added to the polymerization during conversion of the last 10 percent by weight of monomers to polymer.

6. A method as in claim 1 wherein solvent is added to the polymerizing monomers in an amount up to about 5 percent by weight of the monomers during the conversion of the last 10 percent by weight of monomers to polymer.

7. A method as in claim 1 wherein polymerization is interrupted and the polymerizing system is degassed during conversion of the last 10 percent by weight of monomers to polymer.

8. A method as in claim 1 wherein said emulsion polymer is isolated by extruder pinch-off.

9. A method as in claim 1 wherein said emulsion polymer is isolated by freeze coagulation.

* * * * *